United States Patent [19]

Khan

[11] Patent Number: 5,579,439

[45] Date of Patent: Nov. 26, 1996

[54] FUZZY LOGIC DESIGN GENERATOR USING A NEURAL NETWORK TO GENERATE FUZZY LOGIC RULES AND MEMBERSHIP FUNCTIONS FOR USE IN INTELLIGENT SYSTEMS

[75] Inventor: Emdadur R. Khan, San Jose, Calif.

[73] Assignee: National Semiconductor Corporation, Santa Clara, Calif.

[21] Appl. No.: 36,634

[22] Filed: Mar. 24, 1993

[51] Int. Cl.$^6$ .............................. G06F 9/44; G06F 15/80
[52] U.S. Cl. ................... 395/11; 395/3; 395/22; 395/900
[58] Field of Search ................. 395/3, 900, 22, 395/11

[56] References Cited

U.S. PATENT DOCUMENTS 5,168,549  12/1992  Takagi et al. .............................. 395/3

FOREIGN PATENT DOCUMENTS

| 2260002 | 10/1990 | Japan | G06F 9/44 |
| 2292602 | 12/1990 | Japan | G06F 9/44 |
| 3268077 | 11/1991 | Japan | G06F 15/18 |
| 3291729 | 12/1991 | Japan | G06F 9/44 |
| 4092901 | 3/1992 | Japan | G06F 9/44 |
| 4077828 | 3/1992 | Japan | G06F 9/44 |
| 4170641 | 6/1992 | Japan | G06F 9/44 |
| 4186402 | 7/1992 | Japan | G05B 13/02 |
| 4205163 | 7/1992 | Japan | G06F 9/44 |

OTHER PUBLICATIONS

Keller, et al, "Fuzzy Logic Inference Neural Networks," SPIE vol. 1192 Intell. Robots and Comp. Vision, 1989, 582–591.

Cox, E. "Integrating Fuzzy Logic into Neural Nets," AI Expert, Jun. 1992, 43–47.

Horikawa, et al, "On Fuzzy Modeling Using Fuzzy Neural Networks with the Back–Propagation Algorithm," IEEE Trans. on Neural Networks, Sep. 1992, 801–806.

Cela, et al, "Towards A Neural Fuzzy Controller," Int'l. Conf. Syst., Man, and Cybernetics, 1992, 1277–1282.

Hamid R. Berenji, "Refinement of Approximate Reasoning–Based Controllers By Reinforcement Learning", Machine Learning: Proceedings of the Eighth International Workshop, Evanston, Illinois, Jun. 27–29, 1991 (5 pages).

Junhong Nie and D. A. Linkens, "Fuzzy Reasoning Implemented by Neural Networks", IEEE 1992, pp. II–702—II–707.

James J. Buckley, Yoichi Hayashi and Ernest Czogala, "On the Equivalence of Neural Networks and Fuzzy Expert Systems" IEEE 1992, pp. II–691—II–695.

D. E. Rumelhart, G. E. Hinton and R. J. Williams, "Learning Internal Representations By Error Propagation", 1986, Chapter 41, pp. 675–682.

(List continued on next page.)

Primary Examiner—Robert W. Downs
Attorney, Agent, or Firm—Limbach & Limbach L.L.P.

[57] ABSTRACT

A fuzzy logic design generator for providing a fuzzy logic design for an intelligent controller in a plant control system includes an artificial neural network for generating fuzzy logic rules and membership functions data. These fuzzy logic rules and membership functions data can be stored for use in a fuzzy logic system for neural network based fuzzy antecedent processing, rule evaluation and defuzzification, thereby avoiding heuristics associated with conventional fuzzy logic algorithms. The neural network, used as a fuzzy rule generator to generate fuzzy logic rules and membership functions for the system's plant controller, is a multilayered feed-forward neural network based upon a modified version of a back-propagation neural network and learns the system behavior in accordance with input and output data and then maps the acquired knowledge into a new non-heuristic fuzzy logic system. Interlayer weights of the neural network are mapped into fuzzy logic rules and membership functions. Antecedent processing is performed according to a weighted product of the antecedents. One layer of the neural network is used for performing rule evaluation and defuzzification.

87 Claims, 7 Drawing Sheets

OTHER PUBLICATIONS

Sun, et al., 'Fuzzy Modeling Based on Generalized Neural Networks and Fuzzy Clustering Objective Functions', IEEE Conference on Decision and Control, Dec. 1991, Brighton, vol. 3, pp. 2924–2929.

Kawamura, et al., 'A Prototype of Neuro–Fuzzy Cooperation System', IEEE International Conference on Fuzzy Systems, Mar. 8–12, 1992, San Diego, US, pp. 1275–1282.

E. Nishiguchi and K. Sueko, Japanese Kokai Patent Application No. 2-292602 (Dec. 1990), translated from Japanese; includes the Japanese version.

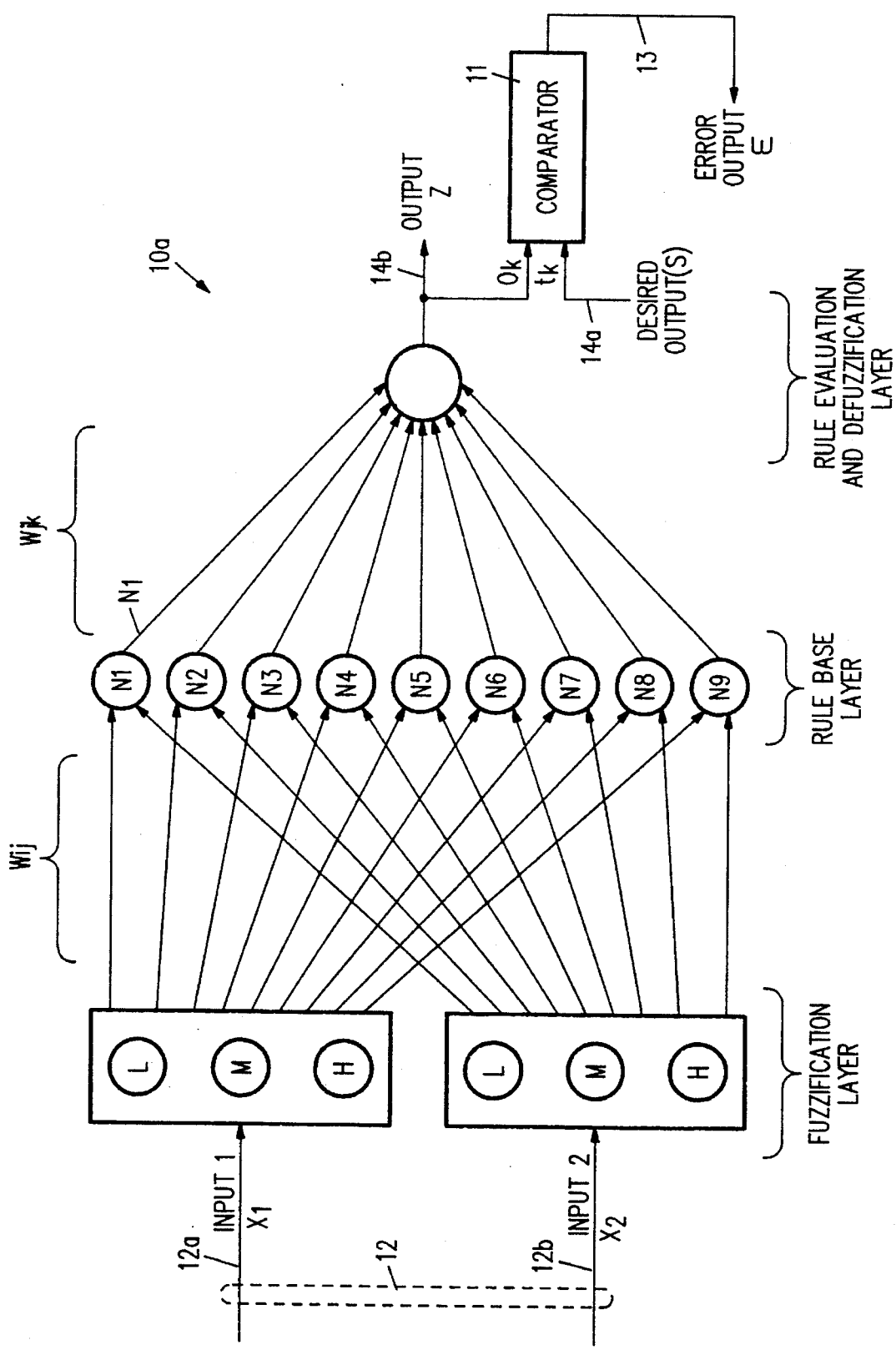

_5,579,439_

FUZZY LOGIC DESIGN GENERATOR USING A NEURAL NETWORK TO GENERATE FUZZY LOGIC RULES AND MEMBERSHIP FUNCTIONS FOR USE IN INTELLIGENT SYSTEMS

BACKGROUND OF THE INVENTION

1. Field of the Invention

The present invention relates to intelligent systems, and in particular, to intelligent controllers using neural network based fuzzy logic.

2. Description of the Related Art

Uses of intelligent controllers have become more numerous and varied in keeping pace with the numerous and varied control requirements of complex modern electronics systems. For example, intelligent controllers are being called upon more frequently for use in assisting or use as servomechanism controllers, as discussed in commonly assigned U.S. patent applications Ser. No. 07/967,992 entitled "Intelligent Servomechanism Controller Using a Neural Network", and Ser. No. 07/859,328, entitled "Intelligent Controller With Neural Network and Reinforcement Learning" (the disclosures of which are each incorporated herein by reference). Further applications include control systems for robotic mechanisms.

One type of intelligent controller seeing increased use and wider application uses "approximate reasoning", and in particular, fuzzy logic. Fuzzy logic, initially developed in the 1960s (see L. A. Zadeh et al., "Fuzzy Sets and Applications", Selected Papers of L. A. Zadeh, by R. R. Yager, S. Ouchinnikov et al. (Eds.), John Wiley & Sons, 1987), has proven to be very successful in solving problems in many control applications where conventional model-based (mathematical modeling of the system to be controlled) approaches are very difficult, inefficient or costly to implement.

An intelligent controller based upon fuzzy logic design has several advantages including simplicity and ease of design. However, fuzzy logic design does have a number of disadvantages as well. As the control system complexity increases, it quickly becomes more difficult to determine the right set of rules and membership functions to accurately describe system behavior. Further, a significant amount of time is needed to properly "tune" the membership functions and adjust the rules before an accurate solution can be obtained. Indeed, for many complex systems, it may even be impossible to arrive at a satisfactory set of rules and membership functions. Moreover, once the rules have been determined, they remain fixed within the fuzzy logic controller, i.e. the controller cannot be modified, e.g. "learn", based upon its experience (except adaptive fuzzy logic systems which do allow some limited adaptation capabilities).

Furthermore, even once a good set of rules and membership functions has been established and used, the resulting solutions, i.e. control signal sets, must be evaluated in accordance with those rules and then "defuzzified". As is known, rule evaluation and defuzzification are two important steps in fuzzy logic design. Rule evaluation, or fuzzy inferencing as it may be called, combines the output from all of the rules which have "fired". However, the output of the fuzzy inferencing still remains as a fuzzy output. Defuzzification then converts this fuzzy output into numerical, i.e. nonfuzzy, outputs.

Several schemes have been proposed for fuzzy inferencing and defuzzification; however, all are based on some form of heuristics. For example, the most popular conventional fuzzy inferencing method uses the maximum of the outputs from all rules for each universe of discourse. The most popular and effective conventional defuzzification uses the center-of-gravity ("COG") method. For simple systems, these methods generally yield good solutions. However, for more complex systems, the heuristic based algorithms may not yield satisfactory results over a wide range of system control inputs. Indeed, conventional antecedent processing according to a "minimum" operation is often unsatisfactory for not providing consistently accurate outputs over a wide range of inputs and/or applications. A further demanding task is that of determining a good set of rules that will work well with those inferencing and defuzzification techniques.

The application of neural networks to learn system behavior has been suggested to overcome some of the problems associated with fuzzy logic based designs. Using a system's input and output data, a neural network can learn the system behavior and, accordingly, generate fuzzy logic rules. See: B. Kosko, "Neural Nets and Fuzzy Systems", Prentice Hall 1992; J. Nie et al., "Fuzzy Reasoning Implemented By Neural Networks", Proceedings of IJCNN92 (International Joint Conference on Neural Networks, June 1992), pp. II702-07; and J. Buckley et al., "On the Equivalent of Neural Networks and Fuzzy Logic", Proceedings of IJCNN92, pp. II691-95.

As is known, a neural network mimics human learning instead of using fixed, preprogrammed approximate reasoning or rules. Also, like fuzzy logic, it uses numerical techniques. In a neural network, many simple processing elements are interconnected by variable connection strengths and the network learns by appropriately varying those connection strengths. It is primarily a data driven system and does not rely heavily upon programming. By proper learning, the neural network can develop good generalization capabilities, and therefore, solve many control problems that would otherwise go unsolved or be inefficiently solved by existing techniques.

However, a neural network may not always be the most effective way to implement an intelligent controller, since implementation of a neural network is more costly compared to fuzzy logic implementations. For example, fuzzy logic may be more effective for a particular application and, by proper programming, a conventional embedded controller can be used to implement the fuzzy logic. A neural network implementation by programming of the conventional embedded controller is also possible, but it will typically be significantly slower. Furthermore, a dedicated hardware implementation, generally more desirable, is more common for fuzzy logic than for a neural network, particularly when considering the relative costs of each.

Another problem with a neural network based solution is its "black box" nature, namely the relationships of the changes in its interlayer weights with the input/output behavior of the system being controlled. Compared to a fuzzy rule based description of the system, a good understanding of the "black box" nature of a neural network is difficult to realize.

Accordingly, it would be desirable to have an improved technique for applying neural network design to the design and implementation of fuzzy logic. Further, it would be desirable to have an improved fuzzy logic design in which antecedent processing, rule evaluation (fuzzy inferencing) and defuzzification can be performed upon control signals generated in accordance with such neural network based fuzzy logic design.

SUMMARY OF THE INVENTION

A fuzzy logic system design in accordance with the present invention combines a neural network with fuzzy logic to generate fuzzy logic rules and membership functions, and to provide neural network based fuzzy antecedent processing, rule evaluation and defuzzification.

In accordance with the present invention, a neural network is used as a fuzzy rule generator to generate a set of fuzzy logic rules and membership functions to be used in the controller for the system intended to be controlled. In a preferred embodiment of the present invention, a multilayered feed-forward neural network, based upon a modified version of a back-propagation neural network, is used that learns the system behavior using input and output data and then mapping the acquired knowledge into a new non-heuristic fuzzy logic system. Interlayer weights of the neural network are mapped into fuzzy logic rules and membership functions.

In further accordance with the present invention, antecedent processing is performed according to a weighted product, or multiplication, of the membership value of the antecedents, rather than using their minimum value.

In still further accordance with the present invention, neural network based algorithms are used for performing rule evaluation and defuzzification. In a preferred embodiment of the present invention, rule evaluation and defuzzification are performed in one layer of the neural network, or in one step of the neural network operation.

These and other features and advantages of the present invention will be understood upon consideration of the following detailed description of the invention and the accompanying drawings.

BRIEF DESCRIPTION OF THE DRAWINGS

FIG. 3 illustrates a neural network for generating fuzzy logic rules and membership functions in accordance with the present invention.

DETAILED DESCRIPTION OF THE INVENTION

Figure 1A:
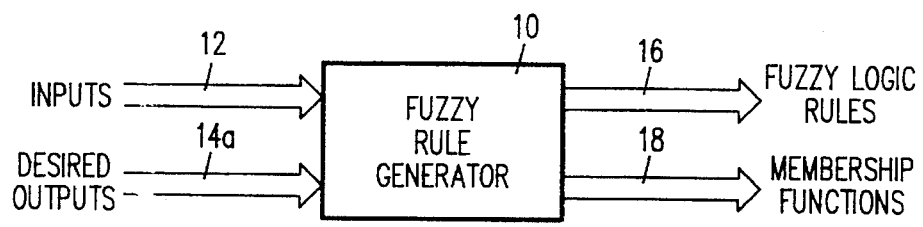
FIG. 1A depicts a fuzzy rule generator in accordance with the present invention.
Figure 1B:
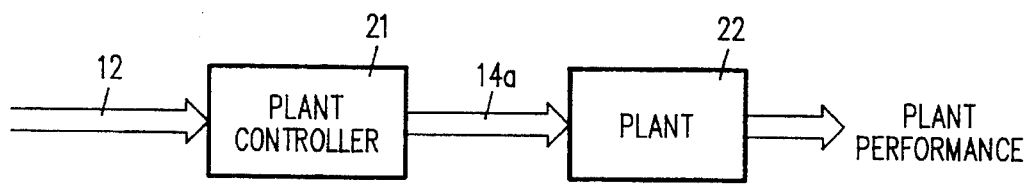
FIG. 1B illustrates a plant controller driving plant, wherein the inputs and outputs of the plant controller are used for learning purposes by the fuzzy rule generator of FIG. 1A.

Referring to FIGS. 1A and 1B, a fuzzy rule generator 10 for generating fuzzy logic rules and membership functions with a neural network in accordance with the present invention receives input signals 12 and 14a representing the inputs and desired outputs, respectively, of a plant controller 21 used for controlling a plant 22. As is known in the art, the input 12 and desired output 14a data can be generated in a number of ways, such as simulation, measurement and learning of the inverse of the plant model. (See e.g. commonly assigned U.S. patent application Ser. No. 07/967,992, entitled "Intelligent Servomechanism Controller Using a Neural Network", the disclosure of which is incorporated herein by reference). Based upon this input data 12, 14a, the fuzzy rule generator 10, in accordance with neural network learning techniques, develops fuzzy logic rules and membership functions (discussed further below), and provides output signals 16 and 18 which represent those fuzzy logic rules and membership functions, respectively.

Figure 2A:
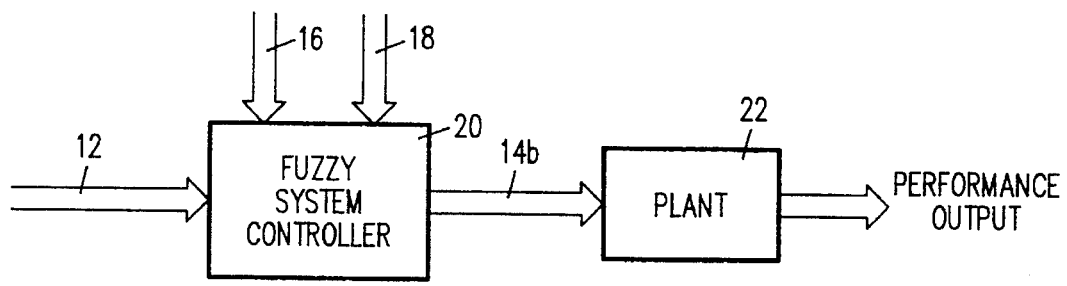
FIG. 2A illustrates a neural network driving a plant, in a feedforward configuration, using the fuzzy logic rules and membership functions generated by the fuzzy rule generator of FIG. 1.
Figure 2B:
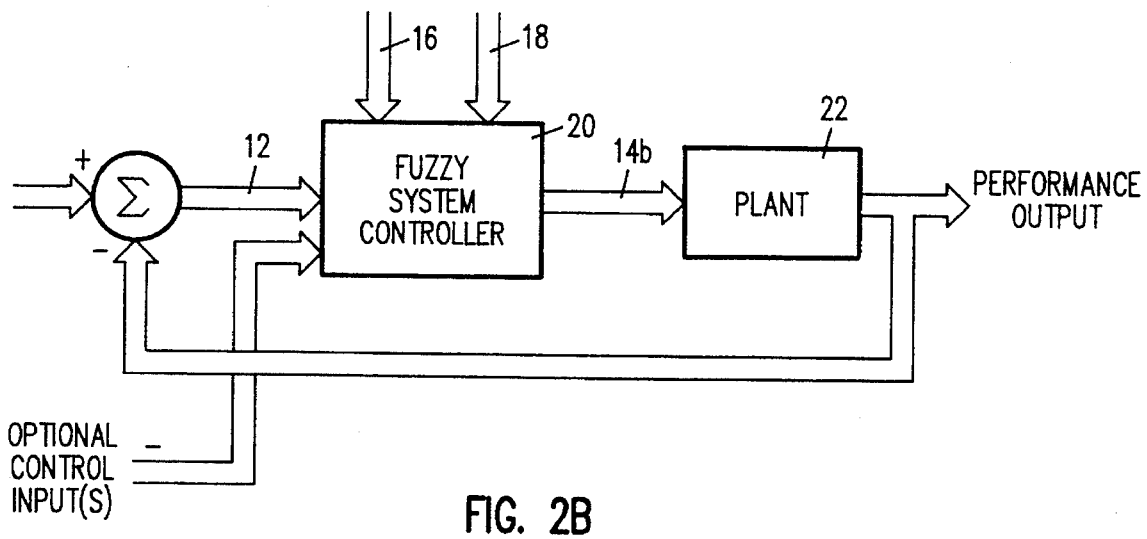
FIG. 2B illustrates a neural network driving a plant, in a feedback configuration, using the fuzzy logic rules and membership functions generated by the fuzzy rule generator of FIG. 1.

Referring to FIGS. 2A and 2B, these fuzzy logic rules 16 and membership functions 18 are used by a fuzzy system controller 20 for generating plant control input(s) 14b in accordance with its inputs 12. (FIG. 2A illustrates a system with a feedforward configuration, and FIG. 2B illustrates a system with a feedback configuration [with provision for other, optional inputs, such as an error change input].) Ideally, these controller outputs 14b generated by the fuzzy system controller 20 in accordance with the fuzzy logic rules 16 and membership functions 18 are identical to the desired outputs 14a originally used by the fuzzy rule generator 10 for its learning (i.e. for the same controller inputs 12). In practice, these controller outputs 14a and 14b are quite close, and often identical, when using fuzzy logic rules 16 and membership functions 18 generated with a fuzzy rule generator 10 in accordance with the present invention.

Referring to FIG. 3, that portion 10a of the fuzzy rule generator 10 which forms the learning mechanism of the neural network includes a comparator 11 and three neural layers: (1) fuzzification; (2) rule base; and (3) rule evaluation and defuzzification. For the sake of simplicity in describing a preferred embodiment of the present invention, the learning mechanism 10a illustrated uses a three-layer neural network for generating the fuzzy logic rules and membership functions of a two-input, one-output system. (However, it should be understood that further embodiments of the present invention include such learning mechanisms using neural networks with more than three layers for generating the fuzzy logic rules and membership functions of systems with other than two inputs or one output.)

The first, or input, layer performs the fuzzification. The values of the input signals $X_1$, $X_2$ are matched against the labels used according to the fuzzy control rule. For this example, the fuzzy control rules represent relative input signal amplitudes classified as low ("L"), medium ("M") or high ("H"). The fuzzification layer is used to define the input membership functions. The middle, or rule base, layer (neurons N1 through N9) represents the fuzzy logic rule base. The actual output 14b of the output neuron is compared against the desired output(s) 14a, with the resulting error $\epsilon$ being used in the neural network's learning process.

In accordance with a preferred embodiment of the present invention, the rule base neurons N1 through N9 have linear functions which perform multiplication, rather than summation, and have slopes of unity. Further, linear neurons whose functions also have slopes of unity are used for the output (rule evaluation and defuzzification) layer neuron. Therefore, the equivalent error $\epsilon_k$ at the input of the output layer can be computed as follows:

$$\epsilon_k = (t_k - o_k) f_k' \quad (1)$$

where:

$\epsilon_k$=equivalent error at the input of the output layer neuron $f_k'$=first derivative of the function of the output layer neuron $t_k$=desired output 14a of the output layer neuron $o_k$=actual output 14b of the output layer neuron Once this equivalent error $\epsilon_k$ has been computed, the middle-to-output layer weights $W_{jk}$ can be modified, or updated as follows:

$$\begin{aligned} W_{jk(new)} &= W_{jk(old)} + \eta \epsilon_k o_j \\ &= W_{jk(old)} + \eta \epsilon_k o_j \end{aligned} \quad (2)$$

where:

$W_{jk(new)}$=updated weight between middle (hidden) layer neuron j and output layer neuron k $W_{jk(old)}$=original weight between middle (hidden) layer neuron j and output layer neuron k $\eta$=learning rate $\epsilon_k$ equivalent error at the input of the output layer neuron $o_j$=actual output of the hidden layer neuron (Further discussion of interlayer weight modification can be found in the aforementioned commonly assigned U.S. patent application Ser. No. 07/859,328, entitled "Intelligent Controller With Neural Network and Reinforcement Learning", the disclosure of which is incorporated herein by reference.)

Next, the equivalent error $\epsilon_j$ at the input to the middle, or hidden, layer neurons N1 through N9 can be computed according to back-propagation modeling techniques as follows:

$$\epsilon_j = f_j' \sum_k \epsilon_k W_{jk} \quad (3)$$

where:

$\epsilon_j$=equivalent error at the input of middle (hidden) layer j $f_j'$=first derivative of the function of middle (hidden) layer neuron j (Further discussion of this back-propagation modeling technique can be found in the aforementioned commonly assigned U.S. patent application Ser. No. 07/967,992, entitled "Intelligent Servomechanism Controller Using a Neural Network", the disclosure of which is incorporated herein by reference.)

Following that, the equivalent error $\epsilon_i$ at the input to the input, or fuzzification, layer can be computed. However, as noted above, the middle, i.e. rule base, layer neurons N1 through N9 use multiplication instead of summation, as follows:

$$f_j = \prod_i W_{ij} o_i \quad (4)$$

where:

$f_j$=function describing the operation of the middle (hidden) layer neuron $W_{ij}$=weight between input layer neuron i and middle (hidden) layer neuron j $o_i$=output of input neuron i Accordingly, the equivalent error $\epsilon_i$ at the input to the fuzzification layer is computed as follows:

$$\epsilon_i = f_i' \sum_j \epsilon_j W_{ij} \left[ \sum_{i, i \neq m} W_{mj} o_m \right] \quad (5)$$

where:

$\epsilon_i$=equivalent error at the input of input layer i $f_i'$=first derivative of the function of input layer neuron i $\epsilon_j$=equivalent error at the input of middle (hidden) layer j $W_{ij}$=weight between input layer neuron i and middle (hidden) layer neuron j $W_{mj}$=weight between input layer neuron m and middle (hidden) layer neuron j $o_m$=output of input neuron m The input-to-middle layer weights $W_{ij}$ can then be modified, or updated, as needed using an equation similar to Equation (2) above, with appropriate substitutions for the corresponding equivalent error $\epsilon_n$ and output $o_n$ signals.

As seen in FIG. 3, the inputs to the middle layer neurons N1 through N9 are the preconditions, or antecedents, of the rules, and the outputs are the conclusions, or consequents. Accordingly, rule base layer neuron N1 can be interpreted as representing the rule that "if input $X_1$ is low and input $X_2$ is low, then the output is $N_1$", wherein $N_1$ can be used to represent the fuzzy conclusion from rule number one.

As noted above, and as is evident from Equation (4) above, the antecedent processing of the present invention uses a multiplication operation, rather than a "minimum" operation as is used in conventional fuzzy logic design. As discussed further below, this means that the signals representing the antecedents are multiplied within the rule base layer neurons N1 through N9, rather than summed and compared to a threshold, or minimum, reference value. For a two-input, one-output learning mechanism 10a, as shown in FIG. 3, if three membership functions are used, we need a maximum of $3^2=9$ rules. Therefore, we need nine middle, or rule base, layer neurons as shown. The output layer neuron, as discussed further below, performs the rule evaluation and defuzzification.

To help expedite learning and convergence, the neural network 10a of the fuzzy rule generator 10 is first initialized with some suitable values of interlayer weights $W_{ij}$, $W_{jk}$. Following that, a set of input 12 and desired output 14 data is applied for several cycles to allow the neural network 10a to converge. At that point, as discussed further below, the generated fuzzy logic rules and membership functions can be extracted. The inputs 12, 14 should be selected so as to cover the entire potential input range well. This will result in better learning, and therefore, a better set of fuzzy logic rules and membership functions. Also, the learning rates used for modifying the interlayer weights should be selected so that the neural network does not oscillate and so that it converges to a good local minima.

If it is desired to generate membership functions of different shapes, the fuzzification layer of FIG. 3 can be constructed of multiple layers of various types of neurons, including combinations of linear and nonlinear function neurons. Accordingly, the weight modification Equations (1) through (5) above will also be modified to correspond to these additional layers of neurons that generate the membership functions.

Figure 4:
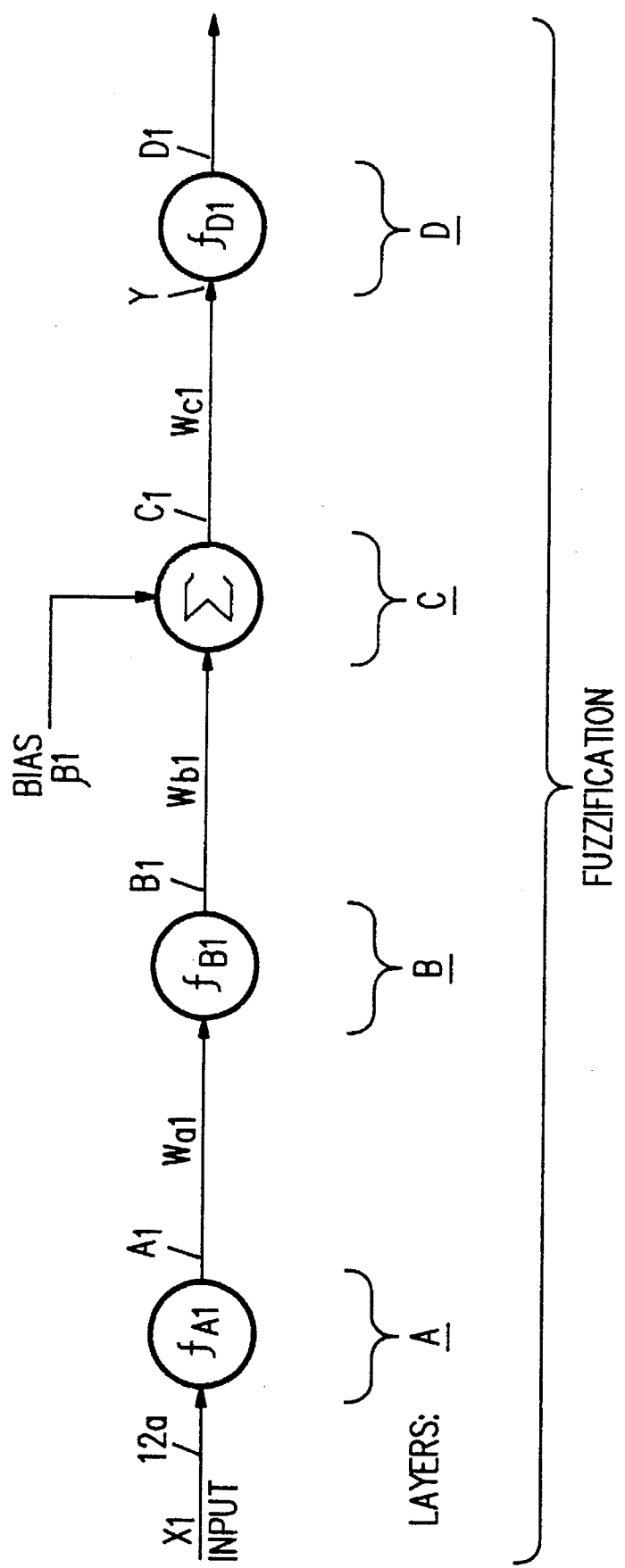
FIG. 4 illustrates an exemplary portion of the fuzzification layer of the neural network illustrated in FIG. 3.

Referring to FIG. 4, the fuzzification layer of the learning mechanism neural network 10a of FIG. 3 can be constructed of four layers A, B, C, D of neurons. For the sake of simplicity, only one signal path for input $X_1$ is shown. It should be understood that, depending upon how many membership functions are used for each input, additional signal paths will be required.

The input signal $X_1$ is processed by layer A and B neurons whose functions are $f_{A1}$ and $f_{B1}$, respectively. Their outputs $A_1$ and $B_1$ are weighted by the interlayer weights $W_{a1}$ and $W_{b1}$, respectively, with the result (i.e. the multiplication product $X_1 f_{A1} W_{a1} f_{B1} W_{b1}$) being summed in layer C with a bias signal $\beta_1$. The sum output $C_1$, weighted by interlayer weight $W_{c1}$, forms the input signal Y for the layer D neuron, whose nonlinear function $f_{D1}$ produces the output signal $D_1$ which goes to neuron N1 of the rule base layer (FIG. 3). Mathematically, this signal path can be represented as follows:

$$y = (X_1 f_{A1} W_{A1} f_{B1} W_{b1} + \beta_1) W_{c1} \quad (6)$$

where:

$X_1$ = first input $f_{A1}$ = first layer neuron function $W_{A1}$ = weight between the first and second layer neurons $f_{B1}$ = second layer neuron function $W_{b1}$ = weight between the second and third layer neurons $\beta_1$ = bias no. 1

$W_{c1}$ = weight between the third and fourth layer neurons

The neural functions $f_{A1}$ and $f_{B1}$ of layers A and B can be kept constant, e.g. as linear gain functions, with the interlayer weights $W_{a1}$, $W_{b1}$ and $W_{c1}$ available for modification during the learning process. If the nonlinear function $f_{D1}$ of layer D is an exponential function (e.g. of the form $1/[1+e^{-y}]$), then the output $D_1$ can be expressed as follows:

$$\begin{aligned} D_1 &= f_D = 1/(1 + e^{-y}) \quad (7) \\ &= \frac{1}{1 + \exp[-y]} \\ &= \frac{1}{1 + \exp[-(X_1 f_{A1} W_{A1} f_{B1} W_{b1} + \beta_1) W_{c1}]} \end{aligned}$$

During learning, i.e. by modifying weights $W_{a1}$, $W_{b1}$, and $W_{c1}$, an exponential membership function can be established. As will be recognized from Equation (7) above, the size and shape of this membership function is determined by the weights $W_{a1}$, $W_{b1}$ and $W_{c1}$, and the bias $\beta_1$. Accordingly, by using different initial values of weights and biases among the various input signal paths, various exponential membership functions of the same type but with different shapes, sizes and positions, can be generated. For example, by using multiple neurons in layers C and D, and using different weight values for their input weights $W_{b1}$ and $W_{c1}$, any class of exponential type membership functions can be generated. Such membership functions would meet the criteria necessary to back-propagate error signals. However, it should be understood that other suitable mathematical functions could be used as well, such as $(1-e^{-y})/(1+e^{-y})$.

After these membership functions have been generated, the weights $W_{a1}$, $W_{b1}$, $W_{c1}$ remain fixed, and a neural network Recall operation will classify the input $X_1$ in one or more fuzzy logic classes (where each neuron in layer D defines a fuzzy logic class). (To perform the Recall operation, the input pattern $\vec{X}$, or vector, is applied to the input layer and propagated through the network without modifying any interlayer weights.)

The AND operation of the membership function noted above is performed as a multiplication operation. Therefore, the antecedent processing is performed according to:

$$v_c = v_a v_b \quad (8)$$

where:

$v_c$ = membership function of the combination of membership functions $v_a$ and $v_b$ $v_a$ = membership function of input A $v_b$ = membership function of input B This use of multiplication, which is dictated by the use of a neural network, produces significantly improved results over those obtained using a "minimum" operation for processing the antecedents. Since the antecedent processing, and the rule evaluation and defuzzification are all based on neural network learning, as discussed further below, use of a "minimum" operation instead of a multiplication operation produces significant errors. Examples of the errors encountered can be seen by referring to Table 1 below.

TABLE 1

| INPUT 1 | INPUT 2 | MINIMUM | MULTIPLICATION |
| --- | --- | --- | --- |
| 1.0 | 1.0 | 1.0 | 1.0 |
| 0.9 | 0.9 | 0.9 | 0.81 |
| 0.8 | 0.8 | 0.8 | 0.64 |
| 0.7 | 0.7 | 0.7 | 0.49 |
| 0.6 | 0.6 | 0.6 | 0.36 |
| 0.5 | 0.5 | 0.5 | 0.25 |
| 0.4 | 0.4 | 0.4 | 0.16 |
| 0.3 | 0.3 | 0.3 | 0.09 |
| 0.2 | 0.2 | 0.2 | 0.04 |
| 0.1 | 0.1 | 0.1 | 0.01 |

Figure 5:
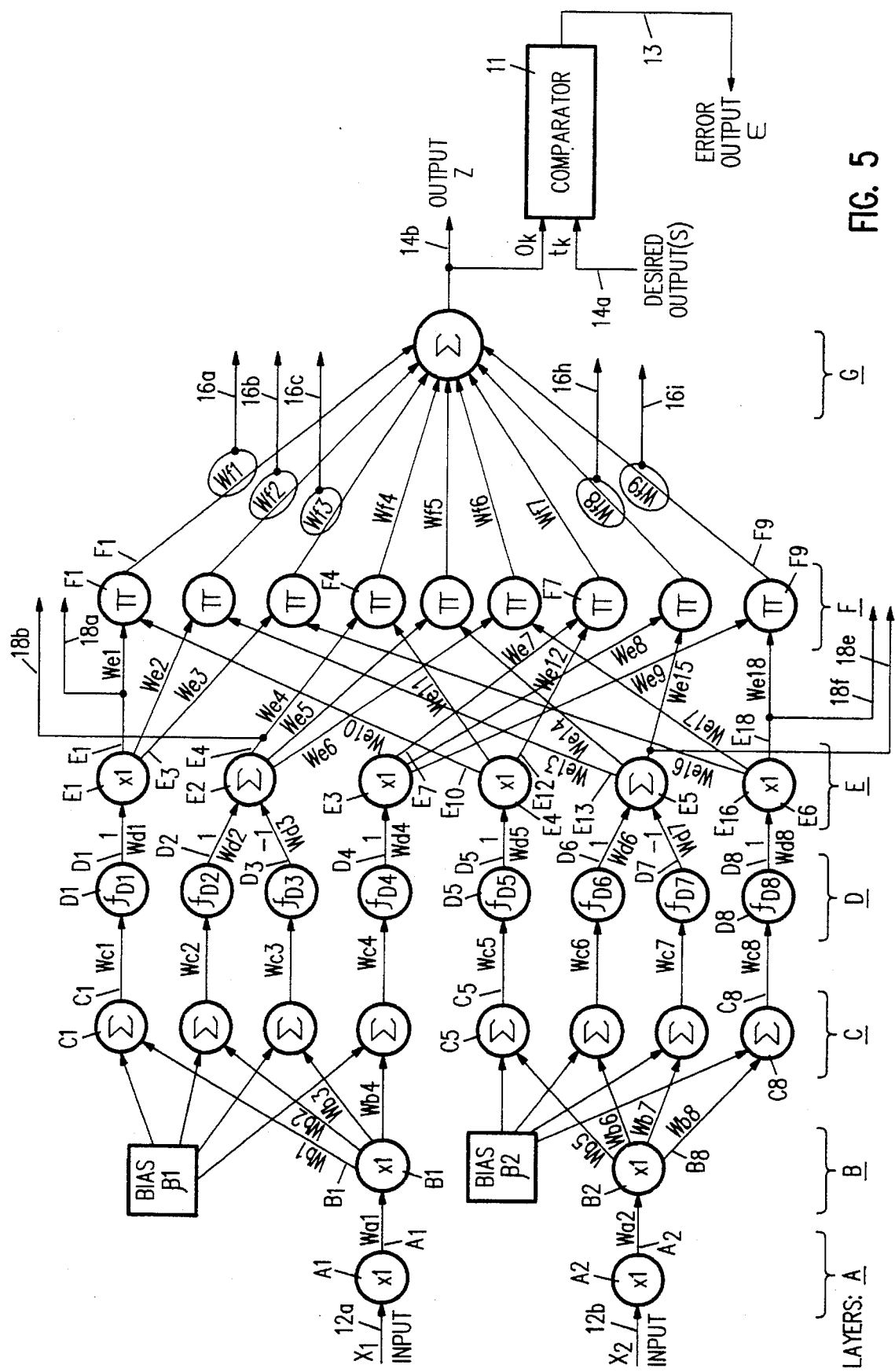
FIG. 5 illustrates in more detail the neural network of FIG. 3.

Referring to FIG. 5, a preferred embodiment of a two-input, one-output neural network 10a in accordance with the present invention includes seven layers of neurons, i.e. layers A through G. The input signals $X_1$ and $X_2$ are received by the layer A neurons A1 and A2, which have gains of unity and produce intermediate signals $A_1$ and $A_2$, respectively. These signals $A_1$, $A_2$ are multiplied, i.e. weighted, by their respective interlayer weights $W_{a1}$ and $W_{a2}$ and received by the layer B neurons B1 and B2, which have gains of unity and produce intermediate signals $B_1$ through $B_4$ and $B_5$ through $B_8$, respectively (where $B_1 = B_2 = B_3 = B_4$ and $B_5 = B_6 = B_7 = B_8$).

These intermediate signals $B_1$ through $B_8$ are weighted by their respective interlayer weights $W_{b1}$ through $W_{b8}$ and received by the layer C neurons C1 through C8, which also receive the two bias signals $\beta_1$ and $\beta_2$. The layer C neurons C1 through C8 perform summation operations on these input signals ($C_1 = B_1 W_{b1} + \beta_1$, $C_2 = B_1 W_{b2} + \beta_1$, ..., $C_8 = B_8 W_{b8} + \beta_2$) and produce intermediate signals $C_1$ through $C_8$. These intermediate signals $C_1$ through $C_8$ are weighted by their respective interlayer weights $W_{c1}$ through $W_{c8}$ and received by the layer D neurons D1 through D8. These intermediate signals $C_1 W_{c1}$, $C_2 W_{c2}$, ..., $C_8 W_{c8}$ are modified in accordance with the functions $f_{D1}$ through $f_{D8}$ of the layer D neurons D1 through D8 (per the discussion regarding Equation (7) above) to produce intermediate signals $D_1$ through $D_8$.

The intermediate signals $D_1$ through $D_8$ are weighted by their respective interlayer weights $W_{d1}$ through $W_{d8}$ which, with the exception of weights $W_{d3}$ and $W_{d7}$, have values of unity. Weights $W_{d3}$ and $W_{d7}$ have values of negative one (−1). The resulting product signals $D_1 W_{d1}$, $D_2 W_{d2}$, ..., $D_8 W_{d8}$ are received by the layer E neurons E1 through E6. Layer E neurons E1, E3, E4 and E6 have gains of unity and produce from their respective input signals $D_1 W_{d1}$, $D_4 W_{d4}$, $D_5 W_{d5}$ and $D_8 W_{d8}$ further intermediate signals $E_1$ through $E_3$, $E_7$ through $E_{12}$ and $E_{16}$ through $E_{18}$ (where $E_1 = E_2 = E_3$, $E_7 = E_8 = E_9$, $E_{10} = E_{11} = E_{12}$ and $E_{16} = E_{17} = E_{18}$). Layer E neurons E2 and E5 receive their respective input signals $D_2W_{d2}$, $D_3W_{d3}$, $D_6W_{d6}$ and $D_7W_{d7}$, perform summation operations and provide intermediate signals $E_4$ through $E_6$ and $E_{13}$ through $E_{15}$ (where $E_4=E_5=E_6$ and $E_{13}=E_{14}=E_{15}$).

The neurons of layers A through E establish the membership functions 18. The membership functions 18 are established by taking the outputs of the layer E neurons 18a ($E_1$ [or $E_2$ or $E_3$]) through 18f ($E_{18}$ [or $E_{16}$ or $E_{17}$]) with respect to the network inputs 12a ($X_1$) and 12b ($X_2$). (For purposes of simplification, only membership function signals 18a, 18b, 18e and 18f have been labelled.) Thus, the membership functions 18 can be extracted for later use, e.g. by computing and storing the values of the outputs 18 versus inputs 12 functions (see e.g. FIG. 7).

The layer F neurons F1 through F9 serve as the rule base neurons and each perform multiplication, or product, operations on their respective input signals. For example, as shown, layer F neuron F1 receives and multiplies its input signals $E_1W_{e1}$ and $E_{10}W_{e10}$. Similarly, neuron F2 forms the product of its two input signals $E_2W_{e2}$ and $E_{13}W_{e13}$, and so on through neuron F9. Resulting product signals $F_1$ through $F_9$ are multiplied by their respective interlayer weights $W_{f1}$ through $W_{f9}$, with the resulting product signals $F_1W_{f1}$, $F_2W_{f2}$, ..., $F_9W_{f9}$ received by the layer G neuron. The layer G neuron performs a summation of all of these product signals to produce the final output signal Z.

The output layer weights 16a ($W_{f1}$) through 16i ($W_{f9}$) between the layer F and G neurons form the consequents of the fuzzy logic rules 16. The antecedents for the fuzzy logic rules 16 are formed by FUZZY($E_1$) through FUZZY($E_{18}$), where the function FUZZY($E_N$) represents the value of layer E output $E_N$ (where $N \in \{1,2,3,\ldots,18\}$) based upon the input XM (where $M \in \{1,2\}$) in accordance with the membership functions (discussed above). Accordingly, a typical rule for the configuration of FIG. 5 is: "If X1 is FUZZY(E1) [e.g. "L" per FIG. 3], and X2 is FUZZY(E10) [e.g. "L" per FIG. 3], then the output is $W_{f1}$." Thus, the fuzzy logic rules 16 can be extracted for later use by storing the values of the output layer weights 16a ($W_{f1}$) through 16i ($W_{f9}$).

From the foregoing it can be seen that a better understanding of the "black box" nature of a neural network can be gained. This allows better initial membership functions and fuzzy logic consequents to be estimated. Accordingly, faster and more effective learning can be achieved.

Figure 6:
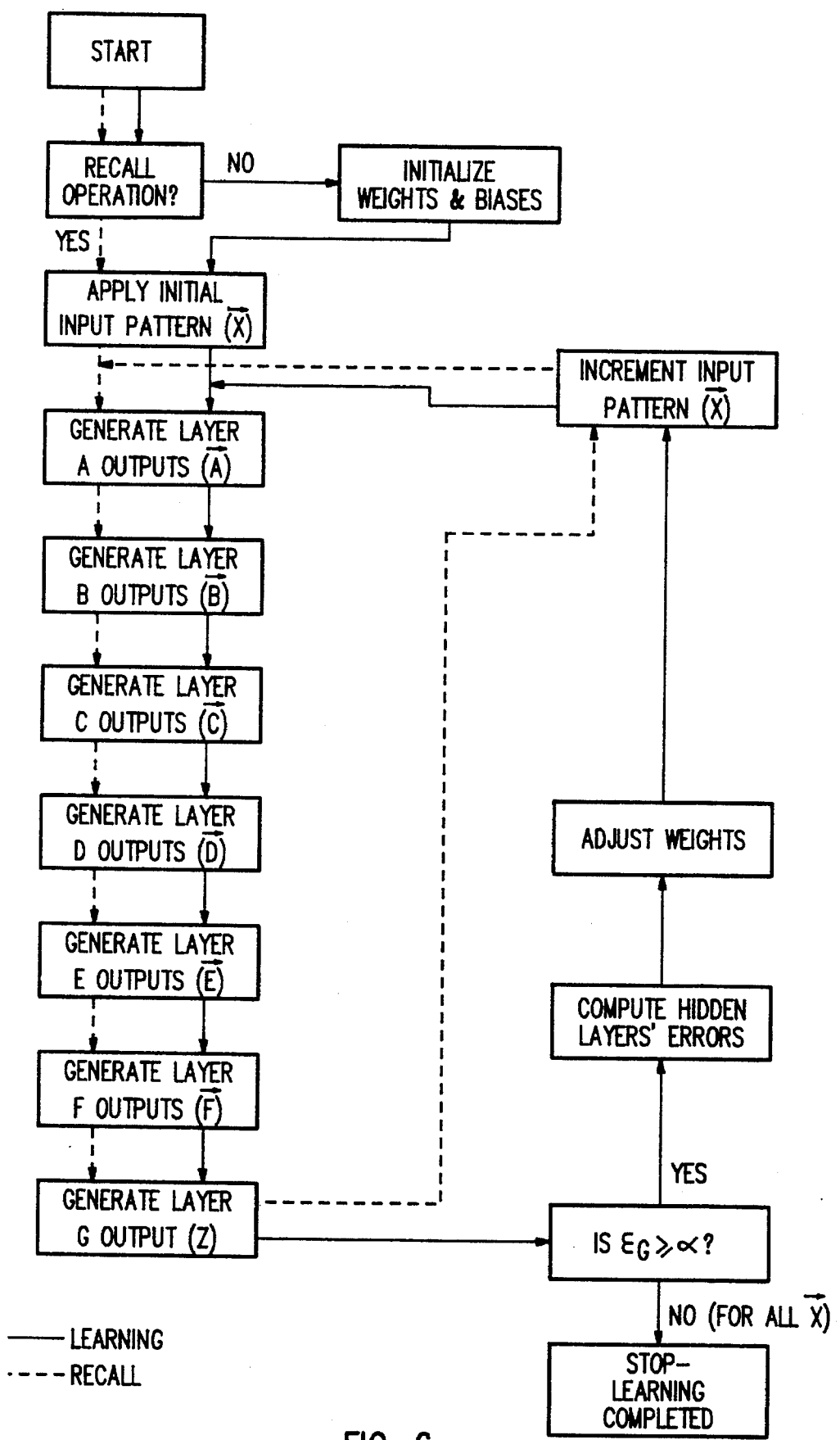
FIG. 6 illustrates a flowchart for neural network learning and Recall operations in accordance with the present invention.

Referring to FIG. 6, the operation of the neural network of FIG. 5 can be visualized in accordance with the illustrated flowchart. First, the interlayer weights $\vec{W}_a$, $\vec{W}_b$, $\vec{W}_c$, $\vec{W}_d$, $\vec{W}_e$ and $\vec{W}_f$, and biases $\beta_1$ and $\beta_2$ are initialized. Then, the layer A neurons A1, A2 receive the input signals $X_1$ and $X_2$, and generate the layer A outputs $\vec{A}$. The layer B neurons B1, B2 receive their respective input signals $\vec{A}\vec{W}_a$ and generate the layer B neuron output signals $\vec{B}$. The layer C neurons C1 through C8 receive their respective input signals $\vec{B}\vec{W}_b$, $\beta_1$, $\beta_2$, and generate the layer C outputs $\vec{C}$. The layer D neurons D1 through D8 receive their respective input signals $\vec{C}\vec{W}_c$ and produce, in accordance with their respective nonlinear functions $f_{D1}$ through $f_{D8}$, the layer D outputs $\vec{D}\vec{W}_d$. The layer E neurons E1 through E6 receive their respective inputs $\vec{D}\vec{W}_a$ and generate the layer E outputs $\vec{E}$. The layer F neurons F1 through F9, the rule base neurons, receive their respective input signals $\vec{E}\vec{W}_e$ and generate the layer F outputs $\vec{F}$. The layer G neuron receives signals $\vec{F}\vec{W}_f$ and generates the layer G output Z.

In accordance with the discussion above regarding Equation (1), the output error $\epsilon_G$ is then computed and compared against a selected reference, or threshold, error value $\alpha$. If the output error $\epsilon_G$ is greater than or equal to the threshold $\alpha$, the equivalent errors $\epsilon_n$ for each of the hidden layers are computed in accordance with the discussion above regarding Equations (3) and (5). Following this, the interlayer weights $\vec{W}_a$, $\vec{W}_b$, $\vec{W}_c$, $\vec{W}_e$ and $\vec{W}_f$ are adjusted. (The interlayer weights $\vec{W}_d$ are not modified, but are kept at their original values of unity or negative one [−1].)

The foregoing steps are repeated until such time as the output error $\epsilon_G$ is less than the selected threshold error $\alpha$ for all input training patterns $\vec{X}$. Once $\epsilon_G < \alpha$ for all $\vec{X}$, the learning operation is complete.

In accordance with the present invention, rule evaluation (fuzzy inferencing) and defuzzification are combined to form a single operation. As discussed further below, this single operation does not use any division, unlike conventional defuzzification such as COG. Accordingly, defuzzification in accordance with the present invention saves time and is more accurate since it is based on neural network learning, where accuracy can be controlled during learning by selecting the desired error criterion. Defuzzification in accordance with the present invention is performed as follows:

$$Z = \sum_j o_j W_{jk} \qquad (9)$$

where:

Z=defuzzified output of neural network $o_j$=output of rule base layer neuron j $W_{jk}$=weight between rule base layer neuron j and output layer neuron k The defuzzified output Z includes the contribution from all of the rules within the rule base layer of neurons and matches the behavior of the neural network. Hence, this defuzzification (e.g. "neural defuzzification") is optimal, particularly since it does not require a division operation. This is to be contrasted with the conventional COG defuzzification operation, which is defined as follows:

$$Z = (\sum_i v_i V_i)/(\sum_i v_i) \qquad (10)$$

where:

$v_i$=membership function i $V_i$=universe of discourse i i=index for universe of discourse (dependent upon number of output membership functions, shape of output membership functions and application)

In COG defuzzification, the index "i" for the universe of discourse can be more than the number of rules. On the other hand, in neural defuzzification according to the present invention, the summation index "j" is limited to the number of rules. Therefore, on the average, neural defuzzification has fewer multiplication operations, as well as no division operation.

As should be understood from the foregoing discussion, neural defuzzification in accordance with the present invention is actually a form of rule evaluation. Since the output of the rule is a "nonfuzzy" number, actual defuzzification is not required. Therefore, the terminology neural rule evaluation, rather than neural defuzzification, can also be used.

A qualitative example of the foregoing would be as follows. Referring back to FIG. 5, if one input 12a ($X_1$) was "low" (L) and the other input 12b ($X_2$) was "low" (L), then the output 14 (Z) would be represented by the product $F_1 W_{f1}$ (of the output $F_1$ and output weight $W_{f1}$ of the first layer F neuron F1).

Quantitatively, the neural network implementation and operation of FIGS. 4 and 5, respectively, have been simulated with very encouraging results. By way of example, one simulation involved the following highly nonlinear analog function:

$$Y = 2X_1^3 + 3X_2^2 - 1 \quad (11)$$

where $X_2 = 2X_1$ has been used to simplify the example.

The corresponding input signal data $X_1$, $X_2$, the resulting output Y, the learning rate $\eta$, learning factor and accuracy factor $\alpha$ used in this simulation are shown below in Table 2.

TABLE 2

| Learning Rate ($\eta$) = 0.01 | | |
|---|---|---|
| Learning Factor = 0.20 | | |
| Accuracy Factor ($\alpha$) = 0.008 | | |
| INPUT 1 X1 | INPUT 2 X2 | OUTPUT Y |
| −2.10 | −4.20 | 33.40 |
| −1.70 | −3.40 | 23.85 |
| −1.30 | −2.60 | 14.89 |
| −0.90 | −1.80 | 7.26 |
| −0.50 | −1.00 | 1.75 |
| −0.10 | −0.20 | −0.88 |
| 0.30 | 0.60 | 0.13 |
| 0.70 | 1.40 | 5.57 |
| 1.10 | 2.20 | 16.18 |
| 1.50 | 3.00 | 32.75 |
| 1.90 | 3.80 | 56.04 |
| 2.10 | 4.20 | 70.44 |

In accordance with the foregoing discussion, the learning factor determines the learning rates within the inner layers of neurons, while the learning rate $\eta$ corresponds to the output layer only. After the neural net has converged with the applied data to an accuracy factor $\alpha$ as indicated in Table 2 using seven input membership functions for each input, the fuzzy logic rules are generated (using the layer F neurons' outputs $F_1$ through $F_9$ and output weights $W_{f1}$ through $W_{f9}$). The resulting fuzzy logic rules for this example are shown below in Table 3.

TABLE 3

| | X2 = | | | | | | |
|---|---|---|---|---|---|---|---|
| X1 = | LH | MH | SH | MD | SL | ML | LL |
| LH | 8.79 | 14.58 | 11.36 | 0.04 | 0.01 | 0.01 | 0.01 |
| MH | 14.58 | 3.62 | 9.86 | 0.20 | 0.01 | 0.01 | 0.01 |
| SH | 11.36 | 9.86 | 22.93 | 19.68 | 0.07 | 0.01 | 0.01 |
| MD | 0.04 | 0.20 | 19.68 | −1.63 | 4.46 | 0.66 | 0.07 |
| SL | 0.01 | 0.01 | 0.07 | 4.46 | 9.26 | 1.06 | 0.89 |
| ML | 0.01 | 0.01 | 0.01 | 0.66 | 1.06 | 5.89 | 11.53 |
| LL | 0.01 | 0.01 | 0.01 | 0.07 | 0.89 | 11.53 | 13.47 | where:
LH = large high
MH = medium high
SH = small high
MD = medium
SL = small low
ML = medium low
LL = large low
and where "large", "medium", "small", "high" and "low" are relative qualitative parameters (e.g. fuzzy variables).
EXAMPLE: If input X1 is SH and input X2 is MH, then output is 9.86.

Figure 7:
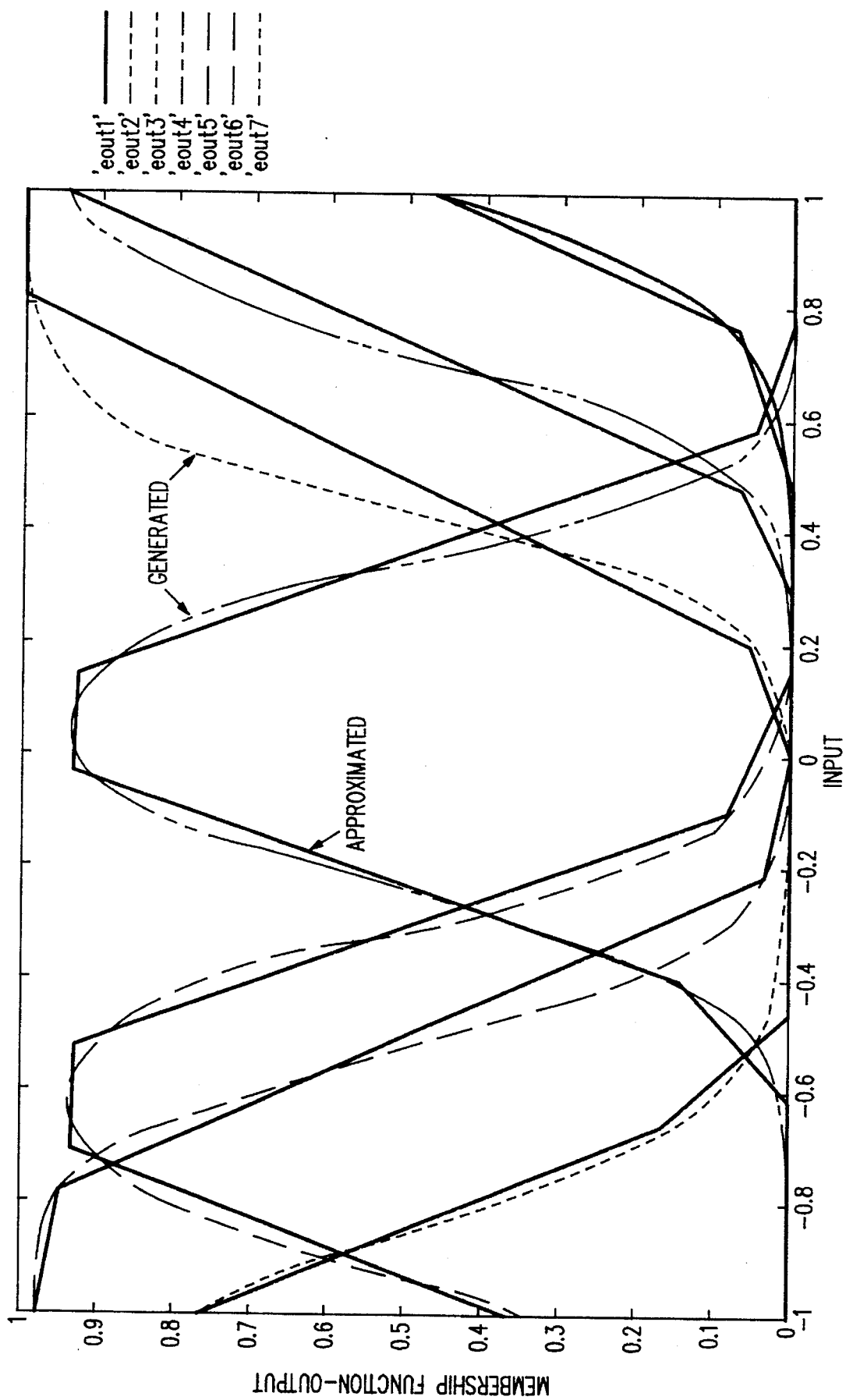
FIG. 7 illustrates an exemplary input membership function generated in accordance with the present invention.

The data shown in Table 3 are numbers, i.e. singletons, as opposed to fuzzy numbers as used in conventional fuzzy logic. The shape of the input membership functions for input 1 ($X_1$) is shown in FIG. 7, and is generated by the neural network. The shape of the membership function for input 2 ($X_2$) is similar since input $X_1$ and X2 are related by Equation (11) above. Accordingly, the two-input, one-output system generated $7^2 = 49$ rules. The number of rules was reduced, i.e. optimized, to 25 using a "fuzzy rule verifier" which, as discussed further below, is basically a fuzzy logic system using the above-described neural network techniques. A set of Recall inputs was used along with the generated fuzzy logic rules and membership functions for both the non-optimized (49 rules) and optimized (25 rules) cases. The resulting computed outputs are shown below in Table 4.

TABLE 4

| Input 1 X1 | Input 2 X2 | Comp'd Out (49 Rules) | Comp'd Out (25 Rules) |
|---|---|---|---|
| −2.100 | −4.200 | 33.321 | 33.321 |
| −1.900 | −3.800 | 28.594 | 28.594 |
| −1.500 | −3.000 | 19.245 | 19.245 |
| −1.100 | −2.200 | 10.805 | 10.805 |
| −0.700 | −1.400 | 4.212 | 4.212 |
| −0.300 | −0.600 | 0.016 | 0.016 |
| 0.100 | 0.200 | −0.836 | −0.836 |
| 0.500 | 1.000 | 2.199 | 2.197 |
| 0.900 | 1.800 | 10.063 | 10.059 |
| 1.300 | 2.600 | 23.697 | 23.694 |
| 1.700 | 3.400 | 43.508 | 43.507 |
| 2.100 | 4.200 | 70.397 | 70.397 |

From the foregoing, a number of observations can be made. First, the result of the antecedent processing, rule evaluation and defuzzification using all of the possible fuzzy logic rules (i.e. all 49 rules) and membership functions generated in accordance with the present invention is substantially equal to the values generated in a neural network Recall operation (column 3). Further, it can be shown that using even fewer than 49 rules (e.g. 25 rules per column 4) will produce comparable results. This is advantageous in that it takes substantially less time, as well as less memory, to compute the output.

It can be seen by looking at the shape of the membership functions (e.g. FIG. 7) that implementing such membership functions on high end processors is not difficult. Moreover, for low end processors, such membership function shapes can be reasonably approximated to convenient geometric shapes, such as triangles or trapezoids. Such approximations can yield reasonably accurate defuzzified outputs.

Figure 8:
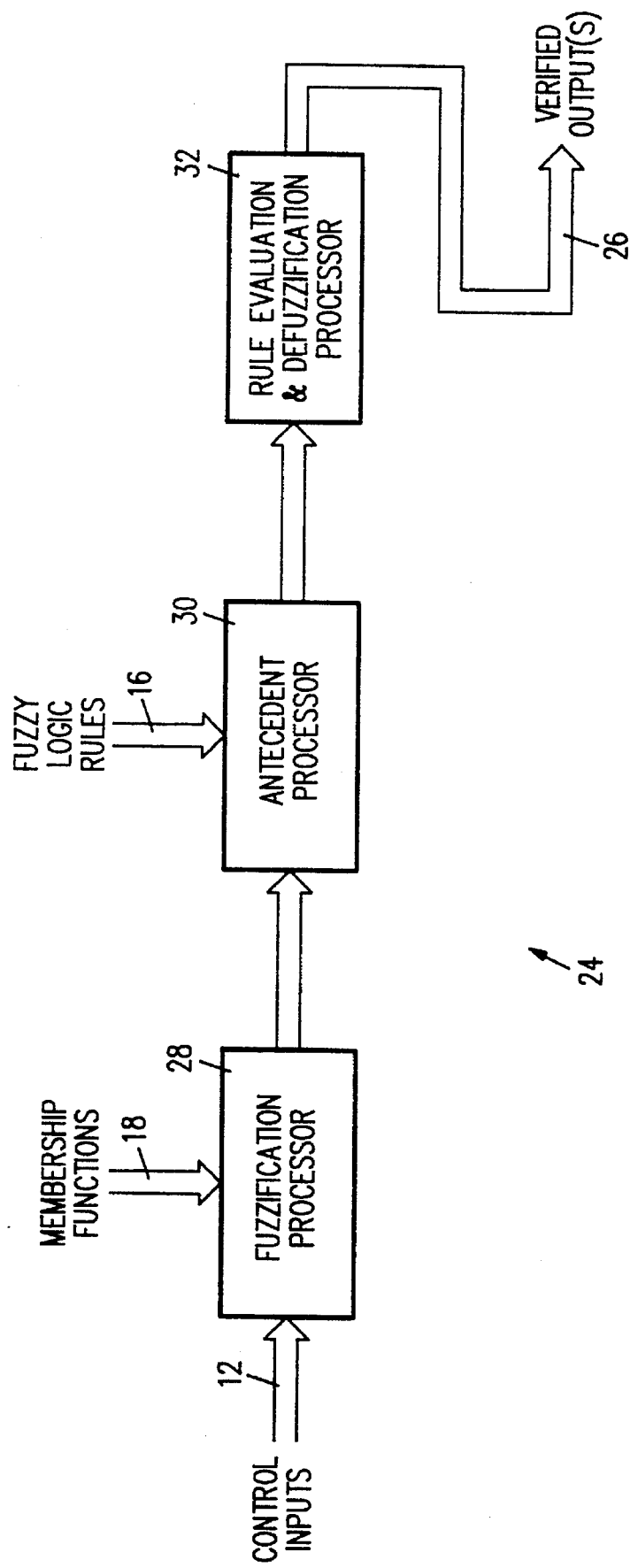
FIG. 8 depicts a fuzzy rule verifier and fuzzy system simulator in accordance with the present invention.

Referring to FIG. 8, a fuzzy rule verifier 24 in accordance with the present invention evaluates the fuzzy logic rules 16 and membership functions 18 generated by the fuzzy rule generator 10 of FIG. 1. The inputs to the fuzzy rule verifier 24 are the fuzzy logic rules 16, membership functions 18 and inputs 12 for which the verified output 26 needs to be computed. (The fuzzification processor 28, antecedent processor 30, and rule evaluation and defuzzification processor 32 can be constructed in the form of a multilayer neural network and operated in accordance with the discussion above regarding FIGS. 3, 4 and 5.)

To verify the fuzzy logic rules 16 and membership functions 18, the verified output 26 of the fuzzy rule verifier 24 is compared with the desired outputs 14. Some of the desired outputs 14', as discussed above, were used during the initial neural network training phase. The other desired outputs 14" can be obtained either by more measurements, or by performing a forward calculation on the learned neural network 10a (FIG. 3). (The latter can be done by performing a Recall operation within the fuzzy rule generator 10.)

From the foregoing, a number of observations can be made. The fuzzy rule verifier 24 can verify whether the computed output 26 from the defuzzification process for a set of inputs is the same as that obtained from a Recall operation through the fuzzy rule generator 10. This can check directly the accuracy of the generated fuzzy logic rules 16 and membership functions 18 provided by the fuzzy rule generator 10. Since the fuzzy rule generator 10 has the capability to reduce the number of fuzzy logic rules 16' methodically, a fuzzy rule verifier 24 can be used to verify whether the resulting defuzzified output 26 using fewer fuzzy logic rules 16' is sufficiently close to the value otherwise obtained from the Recall operation. Additionally, if approximated membership functions 18' are used, e.g. with more convenient geometric shapes, the fuzzy rule verifier 24 can be used to compute the resulting approximated defuzzified output 26' and compare it with the output 26 generated from the Recall operation. This way, acceptable results can be ensured while still allowing for the use of approximated membership functions 18'.

After the optimum number of fuzzy logic rules 16" and membership functions 18" has been determined (including the shapes of the membership functions) using the fuzzy rule verifier 24, a fuzzy logic system design can be completed. The completed design can then be implemented on a chosen processor. A conventional automated code converter can be used to take the fuzzy logic rules and the shape of the input membership functions and generate assembly code therefrom that can be executed by the chosen processor.

From the foregoing, it can be seen that the present invention advantageously combines beneficial attributes of neural networks and fuzzy logic, e.g. the adaptability, or learning capability, of the former and the simplicity of the latter. In doing so, the present invention provides an improved technique for applying neural network design to the design and implementation of fuzzy logic. Also, it provides neural network based fuzzy logic design for antecedent processing, rule evaluation (fuzzy inferencing) and defuzzification.

It should be understood that various alternatives to the embodiments of the present invention described herein can be employed in practicing the present invention. It is intended that the following claims define the scope of the present invention, and that structures and methods within the scope of these claims and their equivalents be covered thereby.

What is claimed is:

1. An artificial neural network for generating pluralities of signals representing a plurality of fuzzy logic rules and a plurality of fuzzy logic membership functions, comprising:

first neural means for receiving a plurality of signals representing input data for an intelligent system and for providing fuzzified data which corresponds to said input data;

second neural means coupled to said first neural means for receiving said fuzzified data and in accordance therewith generating a plurality of membership signals which correspond to a plurality of fuzzy logic membership functions; and third neural means coupled to said second neural means for receiving said plurality of membership signals and in accordance therewith generating a plurality of intermediate signals and a plurality of logic rule signals which represent a plurality of fuzzy logic rules and in accordance therewith generating an output signal which represents defuzzified data, wherein said third neural means includes a single output neuron for receiving and processing said plurality of intermediate signals and in accordance therewith generating said output signal;

wherein said first, second and third neural means cooperate together by performing a learning process with back-propagation of an output error signal based upon said output signal, and wherein said output error signal is propagated serially back from an output of said third neural means through and successively processed by said third, second and first neural means.

2. An artificial neural network as recited in claim 1, wherein said first neural means comprises a first plurality of artificial neurons for fuzzifying said input data to produce said fuzzified data.

3. An artificial neural network as recited in claim 1, wherein said second neural means comprises a second plurality of artificial neurons for generating a plurality of neuron output signals as said plurality of membership signals.

4. An artificial neural network as recited in claim 1, wherein said third neural means multiplies selected ones of said received plurality of membership signals.

5. An artificial neural network as recited in claim 1, wherein said third neural means comprises a third plurality of artificial neurons which includes a plurality of output weights corresponding to said plurality of logic rule signals.

6. An artificial neural network as recited in claim 5, wherein said third plurality of artificial neurons multiply selected ones of said received plurality of membership signals.

7. An artificial neural network as recited in claim 1, further comprising comparison means coupled to said third neural means for receiving therefrom an output signal representing a plant control signal, for receiving an input signal representing a desired control signal, and for comparing said input desired control signal with said output plant control signal and in accordance therewith generating said output error signal.

8. An artificial neural network as recited in claim 7, wherein said comparison means comprises a comparator.

9. An artificial neural network as recited in claim 1, further comprising fourth neural means coupled to said third neural..means for receiving and summing a plurality of signals therefrom to provide an output sum signal representing defuzzified data.

10. An artificial neural network as recited in claim 9, wherein said fourth neural means comprises an artificial neuron.

11. An artificial neural network as recited in claim 9, further comprising comparison means coupled to said fourth neural means for receiving therefrom said output sum signal, for receiving an input signal representing a desired control signal, and for comparing said input desired control signal with said output sum signal and in accordance therewith generating said output error signal, wherein said output sum signal represents a plant control signal.

12. An artificial neural network as recited in claim 11, wherein said comparison means comprises a comparator.

13. An artificial neural network for generating pluralities of signals representing a plurality of fuzzy logic rules and a plurality of fuzzy logic membership functions, comprising:

a first plurality of artificial neurons which receive a plurality of signals representing input data for an intelligent system and provide fuzzified data which correspond to said input data;

a second plurality of artificial neurons, coupled to said first plurality of artificial neurons, which receive said fuzzified data and in accordance therewith generate a plurality of membership signals which correspond to a plurality of fuzzy logic membership functions; and a third plurality of artificial neurons, coupled to said second plurality of artificial neurons, which receive said plurality of membership signals and in accordance therewith generate a plurality of intermediate signals and a plurality of logic rule signals which represent a plurality of fuzzy logic rules and in accordance therewith generate an output signal which represents defuzzified data, wherein said third plurality of artificial neurons includes a plurality of output weights corresponding to said plurality of logic rule signals and a single output neuron which receives and processes said plurality of intermediate signals and in accordance therewith generates said output signal;

wherein said first, second and third pluralities of artificial neurons cooperate together by performing a learning process with back-propagation of an output error signal based upon said output signal, and wherein said output error signal is propagated serially back from an output of said third plurality of artificial neurons through and successively processed by said third, second and first pluralities of artificial neurons.

14. An artificial neural network as recited in claim 13, wherein said third plurality of artificial neurons multiply selected ones of said received plurality of membership signals.

15. An artificial neural network as recited in claim 13, further comprising a comparator, coupled to said third plurality of artificial neurons, which receives therefrom an output signal representing a plant control signal, receives an input signal representing a desired control signal, and compares said input desired control signal with said output plant control signal and in accordance therewith generates said output error signal.

16. An artificial neural network as recited in claim 13, further comprising an artificial neuron, coupled to said third plurality of artificial neurons, which receives and sums a plurality of signals therefrom to provide an output sum signal representing defuzzified data.

17. An artificial neural network as recited in claim 16, further comprising a comparator, coupled to said artificial neuron, which receives therefrom said output sum signal, receives an input signal representing a desired control signal, and compares said input desired control signal with said output sum signal and in accordance therewith generates said output error signal, wherein said output sum signal represents a plant control signal.

18. A computer-implemented method for generating pluralities of signals representing a plurality of fuzzy logic rules and a plurality of fuzzy logic membership functions, comprising the computer-implemented steps of:

receiving a plurality of signals representing input data for an intelligent system;

generating a plurality of fuzzified data signals representing fuzzified data which corresponds to said input data;

generating in accordance with said plurality of fuzzified data signals a plurality of membership signals which correspond to a plurality of fuzzy logic membership functions;

generating in accordance with said plurality of membership signals a plurality of intermediate signals and a plurality of logic rule signals which represent a plurality of fuzzy logic rules;

processing said plurality of intermediate signals with a single output neuron and in accordance therewith generating an output signal which represents defuzzified data; and performing a learning process with back-propagation of an output error signal based upon said output signal in cooperation with said steps of generating said pluralities of fuzzified data signals, membership signals and logic rule signals, wherein said back-propagation of said output error signal is performed following a completion of one iteration of said step of generating said plurality of logic rule signals and is performed successively and prior to subsequent iterations of said steps of generating said pluralities of fuzzified data signals, membership signals and logic rule signals.

19. A method as recited in claim 18, wherein said step of generating a plurality of fuzzified data signals representing fuzzified data which corresponds to said input data comprises fuzzifying said input data with a first plurality of artificial neurons to produce said plurality of fuzzified data signals.

20. A method as recited in claim 18, wherein said step of generating in accordance with said plurality of fuzzified data signals a plurality of membership signals which correspond to a plurality of fuzzy logic membership functions comprises inputting said plurality of fuzzified data signals to a second plurality of artificial neurons and outputting therefrom a plurality of neuron output signals as said plurality of membership signals.

21. A method as recited in claim 18, wherein said step of generating in accordance with said plurality of membership signals a plurality of logic rule signals which represent a plurality of fuzzy logic rules comprises outputting a plurality of weight signals corresponding to a plurality of output weights associated with a third plurality of artificial neurons, wherein said plurality of weight signals represent said plurality of logic rule signals.

22. A method as recited in claim 21, wherein said step of generating in accordance with said plurality of membership signals a plurality of logic rule signals which represent a plurality of fuzzy logic rules further comprises multiplying selected ones of said received plurality of membership signals.

23. A method as recited in claim 18, wherein said step of generating in accordance with said plurality of membership signals a plurality of logic rule signals which represent a plurality of fuzzy logic rules comprises multiplying selected ones of said received plurality of membership signals.

24. A method as recited in claim 18, further comprising the steps of:

providing an output signal representing a plant control signal;

receiving an input signal representing a desired control signal; and comparing said input desired control signal with said output plant control signal and in accordance therewith generating said output error signal.

25. A method as recited in claim 18, further comprising the steps of:

generating a plurality of output signals associated with said plurality of logic rule signals; and summing said plurality of output signals associated with said plurality of logic rule signals to provide an output sum signal representing defuzzified data.

26. A method as recited in claim 25, wherein said step of summing said plurality of output signals associated with said plurality of logic rule signals to provide an output sum signal representing defuzzified data comprises summing said plurality of output signals with an artificial neuron.

27. A method as recited in claim 25, further comprising the steps of:

receiving said output sum signal, wherein said output sum signal represents a plant control signal;

receiving an input signal representing a desired control signal; and comparing said input desired control signal with said output sum signal and in accordance therewith generating said output error signal.

28. An artificial neural network for defuzzifying a plurality of fuzzy data generated in accordance with a plurality of fuzzy logic rules and membership functions, comprising:

rule-based neural means for receiving and processing a plurality of fuzzy signals representing fuzzified data which has been fuzzified in accordance with a plurality of fuzzy logic membership functions to provide in accordance therewith a plurality of processed fuzzy signals;

output weights means coupled to said rule-based neural means for receiving and weighting said plurality of processed fuzzy signals; and single output neuron means coupled to said output weights means for receiving and summing said plurality of weighted, processed fuzzy signals to provide an output signal representing defuzzified data.

29. An artificial neural network as recited in claim 28, wherein said rule-based neural means multiplies selected ones of said plurality of fuzzy signals.

30. An artificial neural network as recited in claim 28, wherein said rule-based neural means comprises a first plurality of artificial neurons.

31. An artificial neural network as recited in claim 30, wherein said first plurality of artificial neurons multiply selected ones of said plurality of fuzzy signals.

32. An artificial neural network as recited in claim 28, wherein said plurality of fuzzy signals corresponds to a plurality of fuzzy logic membership functions.

33. An artificial neural network as recited in claim 28, wherein said output weights means comprises a plurality of interneuron weights.

34. An artificial neural network as recited in claim 33, wherein said plurality of interneuron weights corresponds to a plurality of fuzzy logic rules.

35. An artificial neural network as recited in claim 28, wherein said single output neuron means comprises a single artificial neuron.

36. An artificial neural network as recited in claim 28, further comprising fuzzifier neural means coupled to said rule-based neural means for receiving and fuzzifying a plurality of data signals to provide said plurality of fuzzy signals thereto.

37. An artificial neural network as recited in claim 36, wherein said fuzzifier neural means comprises a second plurality of artificial neurons.

38. An artificial neural network for defuzzifying a plurality of fuzzy data generated in accordance with a plurality of fuzzy logic rules and membership functions, comprising:

a first plurality of artificial neurons which receive and process a plurality of fuzzy signals representing fuzzified data which has been fuzzified in accordance with a plurality of fuzzy logic membership functions to provide in accordance therewith a plurality of processed fuzzy signals;

a plurality of interneuron weights, coupled to said first plurality of artificial neurons, which receive and weight said plurality of processed fuzzy signals; and a single artificial neuron, coupled to said plurality of interneuron weights, which receives and sums said plurality of weighted, processed fuzzy signals to provide an output signal representing defuzzified data.

39. An artificial neural network as recited in claim 38, wherein said first plurality of artificial neurons multiply selected ones of said plurality of fuzzy signals.

40. An artificial neural network as recited in claim 38, wherein said plurality of fuzzy signals corresponds to a plurality of fuzzy logic membership functions.

41. An artificial neural network as recited in claim 38, wherein said plurality of interneuron weights corresponds to a plurality of fuzzy logic rules.

42. An artificial neural network as recited in claim 38, further comprising a second plurality of artificial neurons, coupled to said first plurality of artificial neurons, which receive and fuzzify a plurality of data signals to provide said plurality of fuzzy signals thereto.

43. A computer-implemented method for defuzzifying a plurality of fuzzy data generated in accordance with a plurality of fuzzy logic rules and membership functions, comprising the computer-implemented steps of:

receiving a plurality of fuzzy signals representing fuzzified data which has been fuzzified in accordance with a plurality of fuzzy logic membership functions;

processing said plurality of fuzzy signals to provide a plurality of processed fuzzy signals;

weighting said plurality of processed fuzzy signals; and summing said plurality of weighted, processed fuzzy signals, in accordance with a single summing function, to provide an output signal representing defuzzified data.

44. A method as recited in claim 43, wherein said step of processing said plurality of fuzzy signals to provide a plurality of processed fuzzy signals comprises multiplying selected ones of said plurality of fuzzy signals.

45. A method as recited in claim 43, wherein said step of processing said plurality of fuzzy signals to provide a plurality of processed fuzzy signals comprises processing said plurality of fuzzy signals with a plurality of artificial neurons.

46. A method as recited in claim 45, wherein said step of processing said plurality of fuzzy signals to provide a plurality of processed fuzzy signals further comprises multiplying selected ones of said plurality of fuzzy signals.

47. A method as recited in claim 43, wherein said plurality of fuzzy signals corresponds to a plurality of fuzzy logic membership functions.

48. A method as recited in claim 43, wherein said step of weighting said plurality of processed fuzzy signals comprises weighting said plurality of processed fuzzy signals with a plurality of interneuron weights.

49. A method as recited in claim 48, wherein said plurality of interneuron weights corresponds to a plurality of fuzzy logic rules.

50. A method as recited in claim 43, wherein said step of summing said plurality of weighted, processed fuzzy signals to provide a defuzzified output signal comprises summing said plurality of weighted, processed fuzzy signals with an artificial neuron.

51. A method as recited in claim 43, further comprising the step of receiving and fuzzifying a plurality of data signals to provide said plurality of fuzzy signals.

52. A method as recited in claim 51, wherein said step of receiving and fuzzifying a plurality of data signals to provide said plurality of fuzzy signals comprises receiving and fuzzifying said plurality of data signals with a second plurality of artificial neurons.

53. An artificial neural network for processing a plurality of input signals as a plurality of fuzzy logic rule antecedents, comprising:

input neural means for receiving and fuzzifying a plurality of input data signals to provide a plurality of fuzzified data signals corresponding to a plurality of fuzzy logic rule antecedents; and output neural means coupled to said input neural means for receiving and multiplying together selected ones of said plurality of fuzzified data signals to provide a plurality of product signals corresponding to a plurality of fuzzy logic rule consequents.

54. An artificial neural network as recited in claim 53, wherein said input neural means comprises a first plurality of artificial neurons.

55. An artificial neural network as recited in claim 53, wherein said output neural means comprises a second plurality of artificial neurons.

56. An artificial neural network as recited in claim 53, further comprising output weights means coupled to said output neural means for receiving and weighting said plurality of product signals to provide a plurality of weighted product signals.

57. An artificial neural network as recited in claim 56, wherein said output weights means comprises a plurality of interneuron weights.

58. An artificial neural network as recited in claim 57, wherein said plurality of interneuron weights corresponds to a plurality of fuzzy logic rules.

59. An artificial neural network as recited in claim 56, further comprising neural summing means coupled to said output weights means for receiving and summing said plurality of weighted product signals.

60. An artificial neural network as recited in claim 59, wherein said neural summing means comprises an artificial neuron.

61. An artificial neural network for processing a plurality of input signals as a plurality of fuzzy logic rule antecedents, comprising:

a first plurality of artificial neurons which receive and fuzzify a plurality of input data signals to provide a plurality of fuzzified data signals corresponding to a plurality of fuzzy logic rule antecedents; and a second plurality of artificial neurons, coupled to said first plurality of artificial neurons, which receive and multiply together selected ones of said plurality of fuzzified data signals to provide a plurality of product signals corresponding to a plurality of fuzzy logic rule consequents.

62. An artificial neural network as recited in claim 61, further comprising a plurality of interneuron weights, coupled to said second plurality of artificial neurons, which receive and weight said plurality of product signals to provide a plurality of weighted product signals.

63. An artificial neural network as recited in claim 62, wherein said plurality of interneuron weights corresponds to a plurality of fuzzy logic rules.

64. An artificial neural network as recited in claim 62, further comprising an artificial neuron, coupled to said plurality of interneuron weights, which receives and sums said plurality of weighted product signals.

65. A computer-implemented method for processing a plurality of input signals as a plurality of fuzzy logic rule antecedents, comprising the computer-implemented steps of:

receiving a plurality of input data signals;

fuzzifying said plurality of input data signals to provide a plurality of fuzzified data signals corresponding to a plurality of fuzzy logic rule antecedents; and multiplying together selected ones of said plurality of fuzzified data signals to provide a plurality of product signals corresponding to a plurality of fuzzy logic rule consequents.

66. A method as recited in claim 65, wherein said step of fuzzifying said plurality of input data signals to provide a plurality of fuzzified data signals corresponding to a plurality of fuzzy logic rule antecedents comprises fuzzifying said plurality of input data signals with a first plurality of artificial neurons.

67. A method as recited in claim 65, wherein said step of multiplying together selected ones of said plurality of fuzzified data signals to provide a plurality of product signals comprises multiplying together selected ones of said plurality of fuzzified data signals with a second plurality of artificial neurons.

68. A method as recited in claim 65, further comprising the step of receiving and weighting said plurality of product signals to provide a plurality of weighted product signals.

69. A method as recited in claim 68, wherein said step of receiving and weighting said plurality of product signals to provide a plurality of weighted product signals comprises receiving and weighting said plurality of product signals with a plurality of interneuron weights.

70. A method as recited in claim 69, wherein said plurality of interneuron weights corresponds to a plurality of fuzzy logic rules.

71. A method as recited in claim 68, further comprising the step of summing said plurality of weighted product signals.

72. A method as recited in claim 71, wherein said step of summing said plurality of weighted product signals comprises summing said plurality of weighted product signals with an artificial neuron.

73. An artificial neural network for processing a plurality of input data in accordance with fuzzy logic, comprising:

input neural means for receiving and fuzzifying a plurality of input signals representing numerical data to provide a plurality of fuzzy signals representing fuzzified data; and output neural means coupled to said input neural means for receiving and processing said plurality of fuzzy signals in accordance with a plurality of numerical fuzzy logic rule consequents in the form of singletons corresponding to unit-dimensional data to provide a plurality of numerical signals.

74. An artificial neural network as recited in claim 73, wherein said input neural means comprises a first plurality of artificial neurons.

75. An artificial neural network as recited in claim 73, wherein said output neural means comprises a second plurality of artificial neurons.

76. An artificial neural network as recited in claim 75, wherein said plurality of numerical fuzzy logic rule consequents comprise a plurality of neural weights associated with said second plurality of artificial neurons.

77. An artificial neural network as recited in claim 73, further comprising neural summing means coupled to said output neural means for receiving and summing said plurality of numerical signals.

78. An artificial neural network as recited in claim 77, wherein said neural summing means comprises an artificial neuron.

79. An artificial neural network for processing a plurality of input data in accordance with fuzzy logic, comprising:

a first plurality of artificial neurons which receive and fuzzify a plurality of input signals representing numerical data to provide a plurality of fuzzy signals representing fuzzified data; and a second plurality of artificial neurons, coupled to said first plurality of artificial neurons, which receive and process said plurality of fuzzy signals in accordance with a plurality of numerical fuzzy logic rule consequents in the form of singletons corresponding to unit-dimensional data to provide a plurality of numerical signals.

80. An artificial neural network as recited in claim 79, wherein said plurality of numerical fuzzy logic rule consequents comprise a plurality of neural weights associated with said second plurality of artificial neurons.

81. An artificial neural network as recited in claim 79, further comprising an artificial neuron, coupled to said second plurality of artificial neurons, which receives and sums said plurality of numerical signals.

82. A computer-implemented method for processing a plurality of input data in accordance with fuzzy logic, comprising the computer-implemented steps of:

receiving a plurality of input signals representing numerical data;

fuzzifying said plurality of input signals to provide a plurality of fuzzy signals representing fuzzified data; and processing said plurality of fuzzy signals in accordance with a plurality of numerical fuzzy logic rule consequents in the form of singletons corresponding to unit-dimensional data to provide a plurality of numerical signals.

83. A method as recited in claim 82, wherein said step of fuzzifying said plurality of input signals to provide a plurality of fuzzy signals representing fuzzified data comprises fuzzifying said plurality of input signals with a first plurality of artificial neurons.

84. A method as recited in claim 82, wherein said step of processing said plurality of fuzzy signals in accordance with a plurality of fuzzy logic rule consequents which are numerical to provide a plurality of numerical signals comprises processing said plurality of fuzzified data signals with a second plurality of artificial neurons.

85. A method as recited in claim 82, wherein said step of processing said plurality of fuzzy signals in accordance with a plurality of fuzzy logic rule consequents which are numerical to provide a plurality of numerical signals comprises processing said plurality of fuzzified data signals with a second plurality of artificial neurons and a plurality of neural weights associated therewith.

86. A method as recited in claim 82, further comprising the step of summing said plurality of numerical signals.

87. A method as recited in claim 86, wherein said step of summing said plurality of numerical signals comprises summing said plurality of numerical signals with an artificial neuron.

* * * * *

UNITED STATES PATENT AND TRADEMARK OFFICE
CERTIFICATE OF CORRECTION

PATENT NO. : 5,579,439
DATED : November 26, 1996
INVENTOR(S) : EMDADUR R. KHAN

It is certified that error appears in the above-indentified patent and that said Letters Patent is hereby corrected as shown below:

In Col. 14, line 39, after "neural" delete --..--.

Signed and Sealed this

Eighteenth Day of February, 1997

Attest:

BRUCE LEHMAN

*Attesting Officer*　　　*Commissioner of Patents and Trademarks*